(No Model.)
J. SMITH.
SUPPLEMENTAL TERRET ATTACHMENT FOR HARNESS.
No. 557,904.          Patented Apr. 7, 1896.
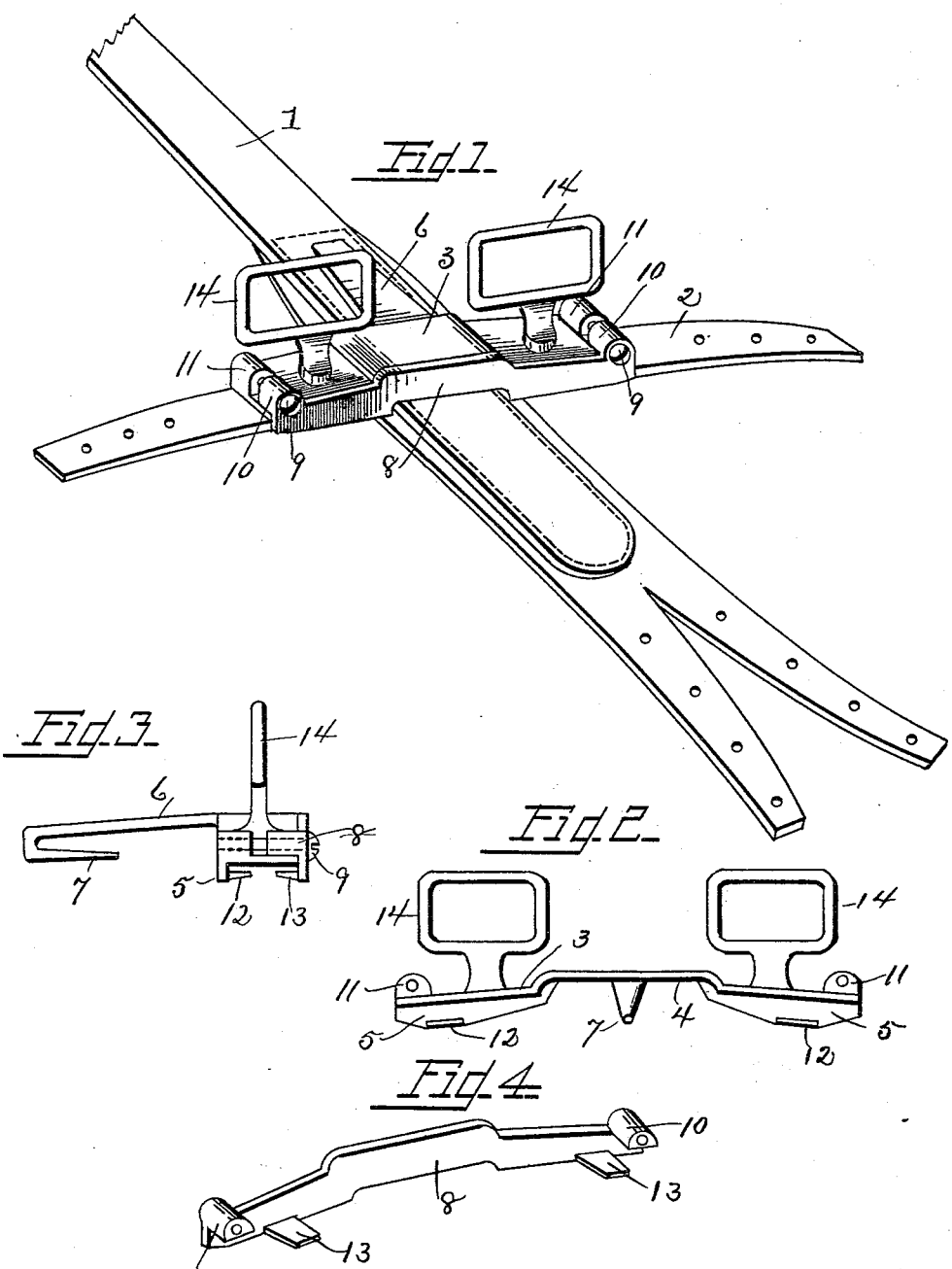
WITNESSES
Carroll J. Webster
Floyd R. Webster
INVENTOR
John Smith
By William Webster Atty.

UNITED STATES PATENT OFFICE.

JOHN SMITH, OF ELLSWORTH, WISCONSIN.

SUPPLEMENTAL TERRET ATTACHMENT FOR HARNESS.

SPECIFICATION forming part of Letters Patent No. 557,904, dated April 7, 1896.

Application filed November 30, 1894. Serial No. 530,354. (No model.)

*To all whom it may concern:*

Be it known that I, JOHN SMITH, of Ellsworth, county of Pierce, and State of Wisconsin, have invented certain new and useful Improvements in Supplemental Terret Attachments for Harness; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a supplemental terret attachment for harness, and has especial relation to an adjustable attachment to the back and hip straps for holding the reins in parallel relation to the back-strap.

The object of the invention is to provide an inexpensive rein-holder that shall be readily attached and possess sufficient adjustability to be adaptable to straps of different widths.

The invention consists in the parts and combination of parts hereinafter described, and pointed out in the claims.

In the drawings, Figure 1 is a perspective view of a portion of the back and hip straps of a harness having the attachment secured thereon. Fig. 2 is a rear elevation of the attachment. Fig. 3 is a transverse section of the same, and Fig. 4 is an elevation of the adjustable clamp-plate.

1 designates the back-strap, and 2 the hip-strap upon which the attachment is clamped and held from tendency to longitudinal movement upon the back-strap by an engagement therewith.

3 designates a terret-plate having a curvature to conform to the normal contour of the hip-strap and a central bend 4 to conform to the raised portion of the back-strap, with the front edge 5 depending sufficiently upon each side of the raised portion to abut against the forward edge of the hip-straps. Centrally of the length of plate 3 and coincident with the raised portion there is a forwardly-projecting arm 6, formed with a return bend 7, forming a hook, which engages with the back-band by being inserted into a hole formed therein and serves to hold the plate from tendency to longitudinal movement upon the back-band and also holds the plate firmly upon the same.

Upon the rear side of plate 3 there is secured a clamp-plate 8 by means of screws 9, which pass through bosses 10 formed upon the clamp-plate and into screw-threaded perforations formed in bosses 11 upon the plate 3. Upon the front edge 5 upon each end of plate 3 are rearwardly-extending prongs 12, which slide beneath the hip-strap when the plate is adjusted, and upon clamp-plate 8 are coincident prongs 13, which slide beneath the hip-strap upon the opposite side when the clamp-plate is secured in place, the office of the prongs being to hold plate 3 firmly to the strap.

Upon each end portion of plate 3 are terrets 14, preferably cast integral with the plate, and through which the reins are passed after being passed through the ordinary terrets of the harness and which serve to hold the reins in parallel relation with the back-strap, thereby avoiding the annoyance of slipping down upon the hips of the horse and consequent engagement with projecting portions of the harness or the greater annoyance and danger of being caught beneath the tail of the horse. By reason of the screw-fastenings 9 the clamp-plate may be adjusted to hip-straps of different widths.

While the arm 6 and hook 7 prevent lateral strain upon the hip-strap, in heavy harness, where there is a more rigid hip-strap employed, I may dispense with these elements and in other ways modify the construction without departing from the spirit of my invention.

What I claim is—

1. In a supplemental terret attachment for harness, a plate having terrets upon each end and projections extending transversely of the plate to pass beneath the hip-strap, a clamp-plate having like projections, and means for securing the plate and clamp-plate together.

2. In a supplemental terret attachment for harness, a terret-plate having a curvature coincident with the hip-strap, with a projection at each end extending transversely of the plate to pass beneath the said strap, and a hook to engage the back-strap, and means for clamping the terret-plate to the hip-strap.

3. In a supplemental terret attachment for harness, a plate having terrets upon each end and projections extending transversely of the plate to pass beneath the hip-strap, a clamp-plate having like projections, a boss projecting above the terret-plate at each end thereof, coincident bosses upon the clamp-plate projecting over the terret-plate and screws passed through the said bosses to hold the parts assembled.

In testimony that I claim the foregoing as my own I hereby affix my signature in presence of two witnesses.

JOHN SMITH.

Witnesses:
 A. COMBACKER,
 MINOR MICHAEL.